(No Model.) 3 Sheets—Sheet 1.

T. H. MOTLEY.
MANURE DISTRIBUTER.

No. 605,002. Patented May 31, 1898.

Witnesses:—

Inventor:—

(No Model.)  3 Sheets—Sheet 2.
T. H. MOTLEY.
MANURE DISTRIBUTER.
No. 605,002. Patented May 31, 1898.
*Fig: 2.*
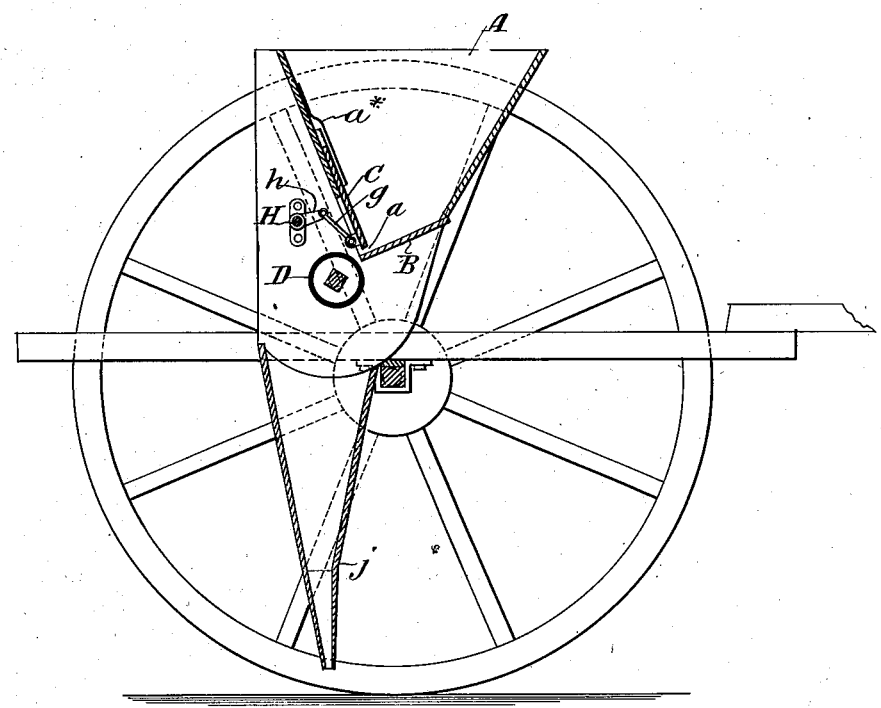
Witnesses:—
Cassell Severance
Geo. E. Sullivan
Inventor
Thomas Hosea Motley
by his Atty (No Model.) 3 Sheets—Sheet 3.

T. H. MOTLEY.
MANURE DISTRIBUTER.

No. 605,002. Patented May 31, 1898.

Witnesses:—
Cassell Severance
Geo. E. Sullivan

Inventor:—
Thomas Hosea Motley
by his Atty
Mason Fenwick & Lawrence

UNITED STATES PATENT OFFICE.

THOMAS HOSEA MOTLEY, OF GRAINTHORPE, ENGLAND, ASSIGNOR OF ONE-HALF TO WILLIAM HADDON OWEN, OF LOUTH, ENGLAND.

MANURE-DISTRIBUTER.

SPECIFICATION forming part of Letters Patent No. 605,002, dated May 31, 1898.

Application filed December 24, 1897. Serial No. 663,343. (No model.) Patented in England November 2, 1896, No. 24,443.

*To all whom it may concern:*

Be it known that I, THOMAS HOSEA MOTLEY, farmer, of Grainthorpe, Lincolnshire, England, have invented certain new and useful Improvements in Manure-Distributers, of which the following is a specification, and for which a patent has been granted to me, together with one William Haddon Owen, in England, dated November 2, 1896, and numbered 24,443, for the subject-matter of this application.

The present invention relates to mechanism for distributing guano or other manure of a like nature on the land. This mechanism may be used by itself or may form part of a machine for sowing seeds, commonly known as a "drill." In such machines or drills the manure is usually carried in a hopper, whence it is discharged and distributed over the land as the machine proceeds at the same time as the seed is sown. A difficulty is found to arise in such machines by reason of the manure from various causes becoming caked in the hopper, so that it cannot readily be delivered therefrom. Many devices have been employed for obviating this difficulty, so as to render it unnecessary for the attendant from time to time to stir up and loosen the contents of the hopper, as is often now the case, to promote its delivery, and to the same end the present invention is directed.

In the accompanying drawings I have shown just so much of a manure-distributing machine as will serve to illustrate this invention.

Figure 3:
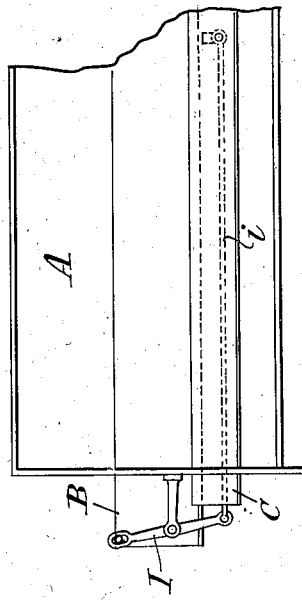
Figure 1:
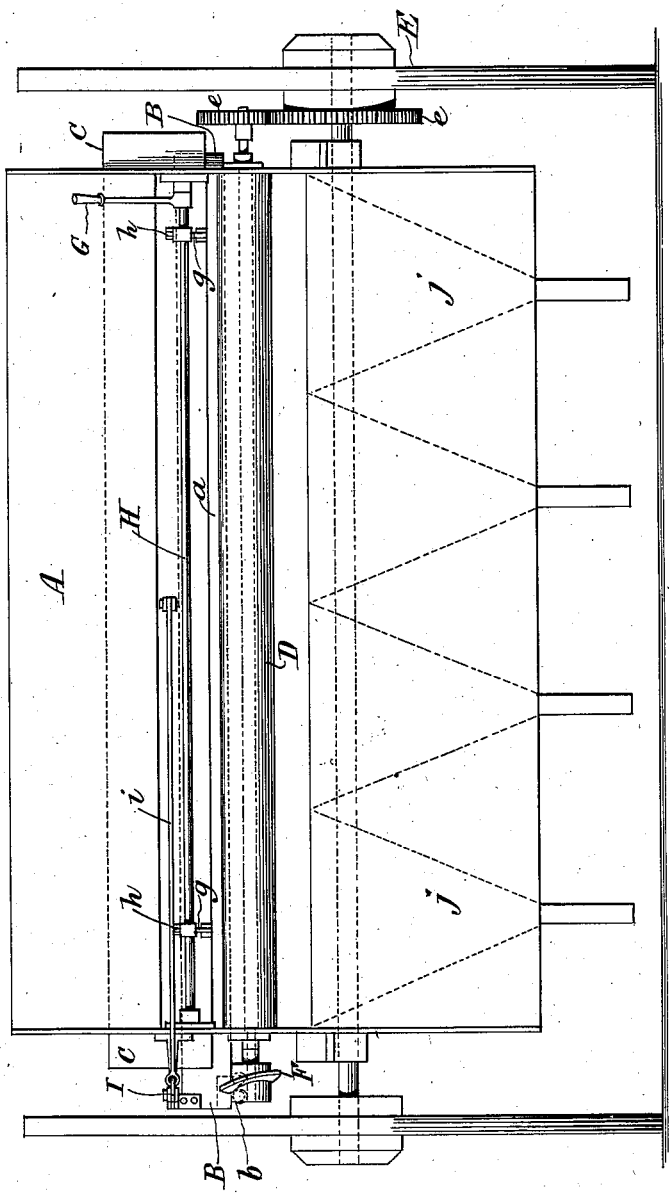
Figure 4:
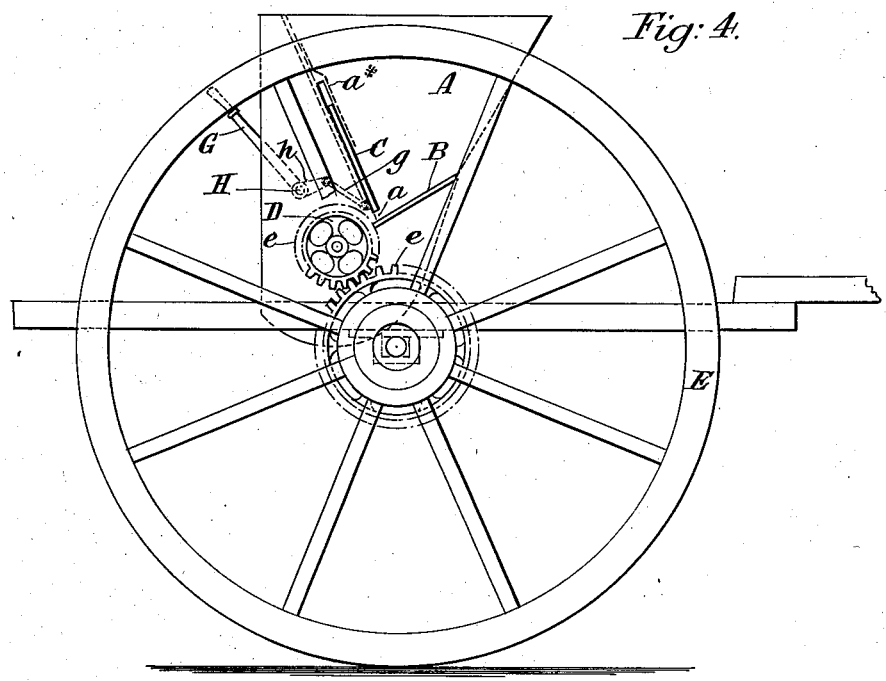
Figure 5:
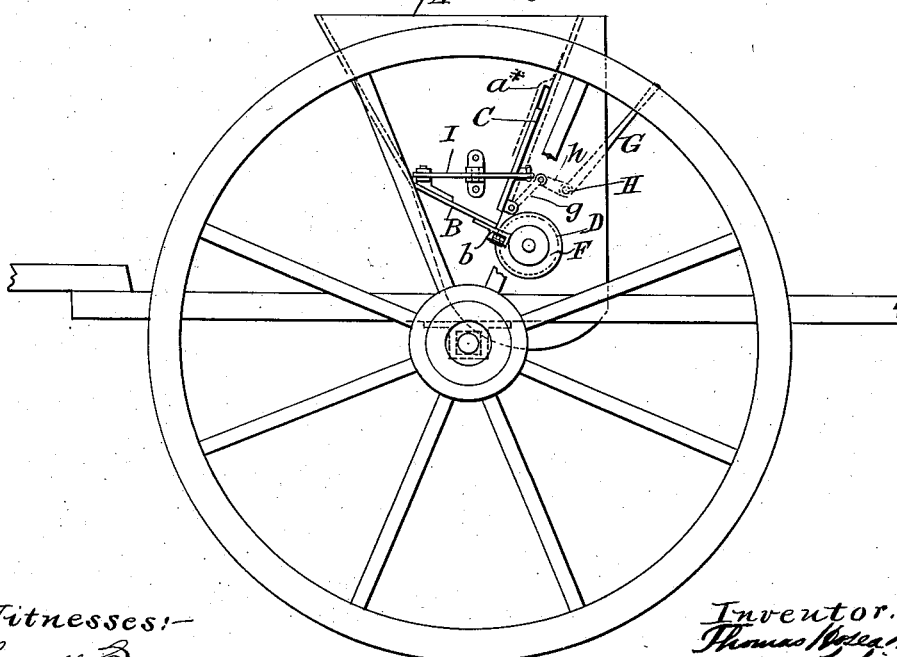

Figure 1 is a rear view. Fig. 2 is a transverse section, and Fig. 3 is a partial plan. Figs. 4 and 5 are side views, respectively, of the right and left of the machine.

According to this invention the hopper containing the manure to be distributed consists of a long box A, extending across the machine and approximately V shape in cross-section. In the lowest part of the hopper is the slot $a$, through which the manure is to be discharged. The hopper on either side of the discharge-slot is composed of boards B and C, capable of sliding endwise to and fro in suitable guides, so as to keep in motion the contents of the hopper and prevent it from becoming caked. Beneath the slot is a roller D, constantly rotated by suitable gearing $e\ e$, actuated by the traveling wheel E when the machine is in motion.

The reciprocation or endwise movement of the sliding boards above mentioned is effected by the rotating roller, preferably by means of an obliquely-mounted disk F, which engages with a notch $b$, provided with antifriction-rolls in the slide B, and by its rotation in an ever-varying vertical plane moves the said slide to and fro as desired.

The movement of the sliding board B may, if necessary, be made more easy by providing antifriction-rollers of small diameter suitably arranged to bear against the board B and support its weight. No such rollers, however, are shown in the drawings.

The sliding board C, which is placed within the back of the box A, beneath the thin apron $a^*$, (see Fig. 2,) and has its ends projecting beyond the ends of the box, (see Fig. 1,) is supported by short links $g\ g$. These links $g\ g$ are jointed to the arms $h\ h$, and the latter are secured to the horizontal shaft H by means of a feather or its equivalent. The shaft H is mounted in bearings in the hopper-frame and is capable of rotation, so as to lift or lower the sliding board C by means of the arms $h\ h$ and links $g\ g$ in order to adjust its height vertically, thereby widening or narrowing the delivery-slot $a$.

G is a hand-lever by which the rotation of the shaft H is effected.

The reciprocation of the sliding board C is effected by means of a rock-lever I, fulcrumed (see Figs. 3 and 5) at the middle of its length to a bracket-arm at the end of the box A. One end is jointed to the sliding board B, while the other is jointed to the end of the link-rod $i$, the other end of which is jointed to a lug on the sliding board C. (See Figs. 1 and 3.) It will thus be seen that when the board B is moved longitudinally by the disk F the shaft I is rocked, and thus moves the board C to and fro in the opposite direction, together with the supporting-arms $h\ h$, which slide easily on the shaft H, although keyed thereto by a feather, as above stated.

$j$ are funnels or conducting-tubes which are used to deliver the manure, together with seed, which under ordinary circumstances would be carried in a hopper. (Not shown in the drawings.)

In the above-described machine it will be seen that the advantages of an agitator within the hopper are obtained without, however, complicating the mechanism or appreciably enhancing the cost of the machine.

In conclusion I would repeat that the machine may be used for the simultaneous delivery of manure and seeds, or it may be used for distributing manure alone broadcast on the land, in which case the funnels of the seed-drill are not employed.

I declare that what I claim is—

1. In a manure-distributer, the combination with a suitable hopper, of slides mounted in the lower portion thereof and adapted to form a discharge-opening between them, a pivoted lever mounted upon the hopper and connected at its ends with the said slides, and means for reciprocating one of the slides, the construction being such that upon one slide being reciprocated it will by means of the lever communicate a reciprocating movement to the other slide, substantially as described.

2. In a manure-distributer, the combination with a suitable hopper, of slides mounted therein and adapted to form a discharge-opening between them, a lever pivoted to the said hopper and connected directly to one of the said slides at one end, a link for connecting the other end of the said lever to the central portion of the other slide, and means for reciprocating one of the slides whereby motion is communicated to both through the said lever, substantially as described.

3. In a manure-distributer, the combination with a suitable hopper, of slides mounted therein and adapted to form a discharge-opening between them, a lever pivoted to said hopper and connected directly to one of the said slides at one end, a link for connecting the other end of the said lever to the central portion of the other slide, and means for raising and lowering the latter slide whereby the size of the discharge-opening may be enlarged or diminished as required, the construction being such that the slides will be caused to reciprocate with respect to each other when in their different adjusted positions, substantially as described.

4. In a manure-distributer, the combination with a suitable hopper, of slides mounted in the lower portion thereof and forming a discharge-opening between them, means for reciprocating the said slides, and means for adjusting one of said slides upon a longitudinal rod whereby the said slide may be raised or lowered to increase or diminish the discharge-opening between the two slides and may still be capable of a longitudinal movement with respect to the hopper, substantially as described.

5. In a manure-distributer, the combination with a suitable hopper, of reciprocating slides mounted in the lower portion thereof and adapted to form a discharge-opening between them, means for reciprocating the said slides, a roller mounted below the said discharge-opening for assisting in the distribution of the contents of the hopper, and means for revolving the said roller, substantially as described.

6. In a manure-distributer, the combination with a suitable hopper, of reciprocating slides mounted therein and adapted to form a discharge-opening between them, a roller mounted below the said discharge-opening, means for rotating the said roller, means connected with the said roller and engaging one of the slides for reciprocating the said slide, a lever pivotally mounted upon the said hopper and engaging the said slide at one end, and means for connecting the opposite end to the other slide, the construction being such that the slides will reciprocate oppositely with respect to each other, substantially as described.

7. In a manure-distributer, the combination with a suitable hopper, of reciprocating slides controlling the discharge from the said hopper, a roller arranged below the said discharge, gearing for connecting the roller with the shaft of the distributer whereby upon the distributer being moved forward the motion from the wheels will be communicated to the said roller, a cam-disk formed upon the shaft of the said roller, friction-rollers upon one of the said slides and adapted to engage said cam-disk whereby a reciprocating movement may be imparted to the said slide, and a lever mounted upon the hopper and engaging the said slide at one end and connected with the other slide at the other end, the construction being such that the slides will be caused to reciprocate in opposite directions with respect to each other, substantially as described.

8. In a manure-distributer, the combination with a suitable hopper, of slides mounted therein and adapted to control the discharge from the said hopper, means for reciprocating one of said slides, a lever mounted upon the hopper and engaging the said actuated slide, a link connected to the said lever and engaging the other slide for communicating motion thereto, links for supporting the latter slide, arms for supporting the said links, the said arms being movably secured upon a shaft transversely mounted in the frame of the distributer, and a lever secured to the said shaft, the construction being such that the height of the latter slide may be regulated by the said lever in order to increase or diminish the discharge-opening between the slides, substantially as described.

9. In a manure-distributer, the combination with a suitable hopper, of slides controlling the discharge therefrom, one of the said slides forming a movable bottom for the hopper, means for adjusting the other slide vertically, an overhanging apron mounted interiorly of the hopper for preventing the material in the hopper from clogging the movement of the latter slide, and means for reciprocating the said slide, substantially as described.

10. In a manure-distributer, the combination with a suitable hopper, of slides mounted in the lower portion thereof and adapted to form a discharge-opening between them, a cam arranged upon the said hopper and adapted to engage one of said slides for reciprocating the same, and means for connecting the said slide to the other slide whereby a reciprocating movement is also imparted to the second slide, substantially as described.

11. In a manure-distributer, the combination with a suitable hopper, of slides mounted in the lower portion thereof and adapted to form a discharge-opening between them, a cam arranged upon the said hopper and adapted to engage one of said slides for reciprocating the same, means for rotating the said cam, friction-rollers upon one of said slides and adapted to engage the said cam whereby a reciprocating movement is imparted to one of said slides, and means for connecting the said slides to the other slide whereby a reciprocating movement is also imparted to the second slide, substantially as described.

Dated this 9th day of December, 1897.

THOMAS HOSEA MOTLEY.

Witnesses:
WM. DOBSON,
W. PEARSON.